United States Patent
Vulich

(10) Patent No.: US 9,854,022 B2
(45) Date of Patent: Dec. 26, 2017

(54) SERVER-SIDE PATH REFERENCE SYSTEMS AND METHODS

(71) Applicant: SAP Portals Israel Ltd., Ra'Anana (IL)

(72) Inventor: Yan Vulich, Kiryat Ono (IL)

(73) Assignee: SAP Portals Israel Ltd., Ra'Anana (IL)

(*) Notice: Subject to any disclaimer, the term of this patent is extended or adjusted under 35 U.S.C. 154(b) by 234 days.

(21) Appl. No.: 14/823,921

(22) Filed: Aug. 11, 2015

(65) Prior Publication Data

US 2017/0048299 A1   Feb. 16, 2017

(51) Int. Cl.
   *G06F 15/16*  (2006.01)
   *H04L 29/08*  (2006.01)
   *G06Q 30/06*  (2012.01)
   *G06Q 50/00*  (2012.01)

(52) U.S. Cl.
   CPC ......... *H04L 67/02* (2013.01); *G06Q 30/0631* (2013.01); *G06Q 50/01* (2013.01); *H04L 67/22* (2013.01)

(58) Field of Classification Search
   CPC ..... H04L 67/02; H04L 67/22; G06Q 30/0631; G06Q 50/01
   See application file for complete search history.

(56) References Cited

U.S. PATENT DOCUMENTS

| | | | |
|---|---|---|---|
| 6,351,708 B1* | 2/2002 | Takagi | G06Q 30/0284 340/928 |
| 6,529,826 B2* | 3/2003 | Kawai | G01C 21/3605 340/991 |
| 8,934,838 B2* | 1/2015 | Kim | H04L 12/14 455/11.1 |
| 9,177,336 B2* | 11/2015 | Hjelm | G06Q 30/0282 |
| 9,367,589 B1* | 6/2016 | Swietlicka | G06F 17/30241 |
| 2011/0207407 A1* | 8/2011 | Kim | H04L 12/14 455/41.2 |
| 2012/0137201 A1* | 5/2012 | White | G06F 17/30899 715/205 |
| 2013/0067114 A1* | 3/2013 | Hjelm | G06Q 50/01 709/243 |
| 2013/0268193 A1* | 10/2013 | Kritt | G01C 21/00 701/533 |
| 2014/0025296 A1* | 1/2014 | Shimizu | G01C 21/00 701/533 |

* cited by examiner

*Primary Examiner* — Moustafa M Meky
(74) *Attorney, Agent, or Firm* — Schwegman Lundberg & Woessner, P.A.

(57) ABSTRACT

Various embodiments herein each include at least one of systems, methods, and software for server-side path reference. One server-side path reference embodiment in the form of a method includes receiving a request for a specific content item, such as a user interface or document, via a network interface device from a requestor. This method may then retrieve, from a navigation history data store, path reference recommendation data with regard to the specific content item. The retrieved path reference recommendation data typically identifies at least one destination most commonly navigated to from the specific content item within web application sessions. The method then transmits the retrieved path reference recommendation data with data of the specific content item to the requestor.

20 Claims, 6 Drawing Sheets

SERVER-SIDE PATH REFERENCE SYSTEMS AND METHODS

BACKGROUND INFORMATION

Many web applications contain vast quantities of information. Web applications typically provide navigation menus to allow web application users to find specific information they are seeking, but the greater the quantity of information available, the more difficult and time consuming the menus become for users seeking specific information.

DETAILED DESCRIPTION

Figure 1:
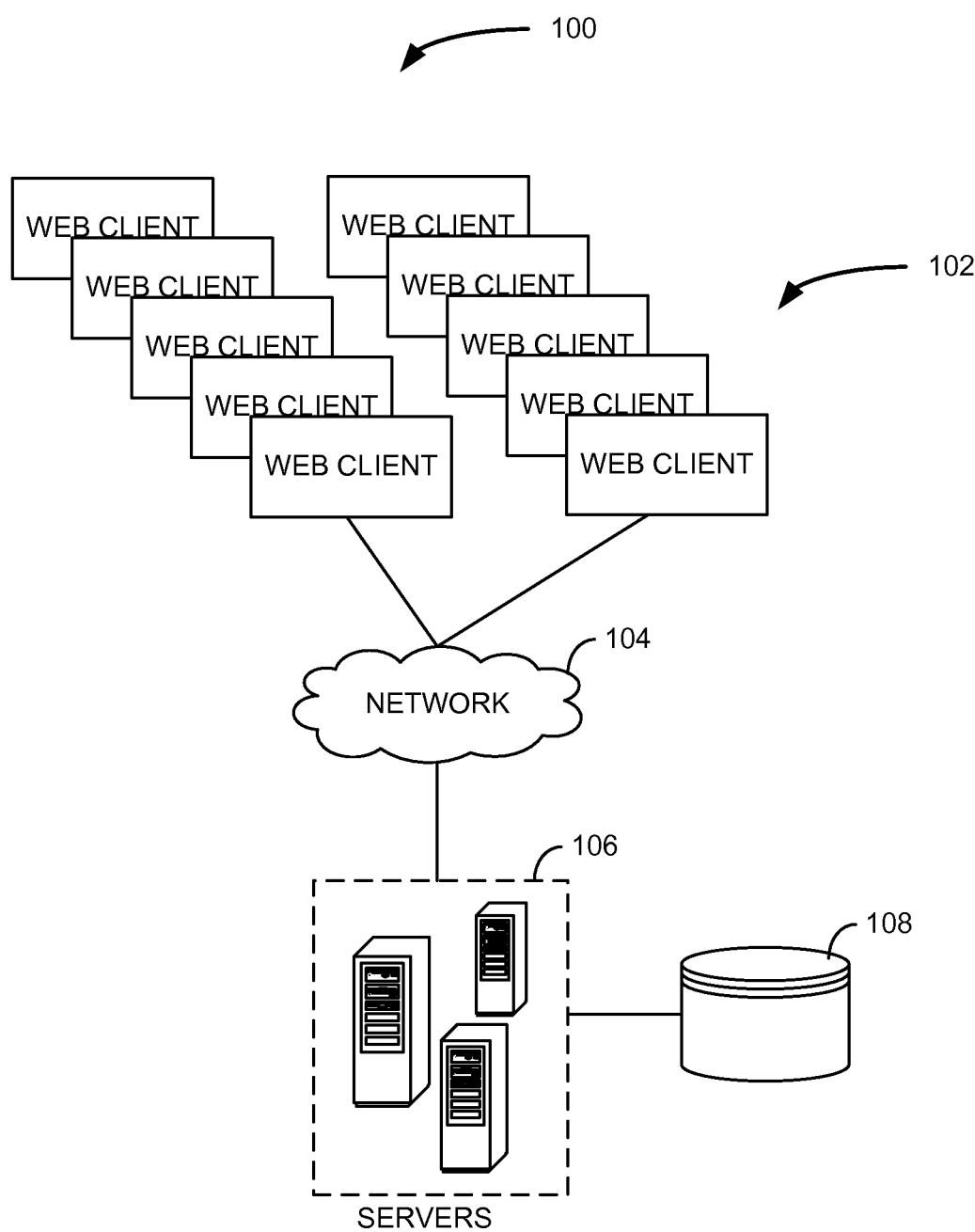
FIG. 1 is a system architectural diagram, according to an example embodiment.

Various embodiments herein each include at least one of systems, methods, and software for server-side path reference. A tracking portion of such embodiments tracks path references of web application user destinations, such as with regard to specific web application functionality and content. This tracking is typically performed with regard to web application sessions, but not with regard to any specific users. The goal of some such embodiments is to identify path references, such as path references of web application functionality and content provided in web application user interfaces, that users eventually traverse or reach from a particular starting or transit point within the web application. Tracking data can then be utilized to recommend high-probability path references, such as web application functional or content destinations, from any given point within the web application.

For example, the tracking data may reveal that web application users, within a certain number of transitions to web application user interfaces providing access to functionality and content, most commonly visit one or more specific web application user interfaces. This tracking data may then be utilized to provide path references on an initial web application user interface or homepage. The tracking data may also be utilized with regard to web application user interfaces other than the initial web application user interface or homepage such that path references may be provided within any given web application user interface, or content presented therein (e.g., video, animations, etc.), to other web application user interfaces or other content most commonly navigated to from the given point within the web application or within content viewed within a web application session. Note that a most common destination, or path references, may be one or more navigation path transitions away from a user interface or content currently being viewed.

Some embodiments further include tracking actions taken within a web application user interface or with regard to content items (e.g., web page, video, product, etc.) when viewed. In some such embodiments, a further path reference recommendation is made with regard to most commonly performed actions with regard to a current view, such as sorting or filtering presented data, clicking on one or more user interface controls, and the like. Such action-related path reference recommendations are provided in some embodiments as explicit links added by a server process to a web application user interface or a content item when transmitted to by a user, such as an addition to a user interface or web page, or as highlights or other graphical indicators with regard to intra-application links, user interface controls, and other elements within a content item when presented to a user.

In some additional embodiments, the action data of user tracked actions may include weighting values associated with web application or content item action goals. A web application or content item action goal, generally referred to as content item action goals, may be viewing a certain web application user interface, a certain content item or a type of content item, performance of a specific action or action-type, and the like. A specific action or action-type of a content item action goal may be an action that increases revenue either directly through performance of the action or indirectly as the action contributes or is a precursor to a web application user interface or content item view or other action that generates revenue. Other content item action goals may be defined for purposes other than generating or increasing revenue, such as a goal to present a certain message or view point that is conveyed by a user interface or content item, such as a document, a web page, an image, a video, a podcast, and the like, or combinations of two or more. The weightings of action data may be taken into account when providing path references, such as by providing a weighting factor with regard to certain paths that include action tracking data that leads to performance or realization of a content item action goal.

These and other embodiments are described below with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a system architectural diagram 100, according to an example embodiment. The system architectural diagram 100 illustrates a highly simplified architecture of a computing environment within which some embodiments may be implemented.

The architectural diagram includes a number of web clients 102. The web clients 102 are generally devices, processes, programs, and app through which users interact with a web application that executes at least in part on one or more servers 106. The devices may be personal computers, mobile devices, and other such devices. The apps and programs may include web browsers, mobile device apps, thin and thick client applications, and the like.

The web clients 102 are connected to a network 104, such as one or more of the Internet, an Intranet, and other such networks. Also connected to the network are the one or more servers 106 that receive web application requests via the network 104 from the web clients 102. The servers 106 are examples of servers on which a server path reference recommendation system may be implemented. The one or more servers 106 may include one or more of each of web servers, application servers, content servers, database servers, and the like. The servers 106 generally retrieve web application data and content from storage 108 and provide that to the web clients 102 via the network 104. The servers 106 are generally where the server-side path reference processing occurs, such as tracking and recommendation process.

Figure 2:
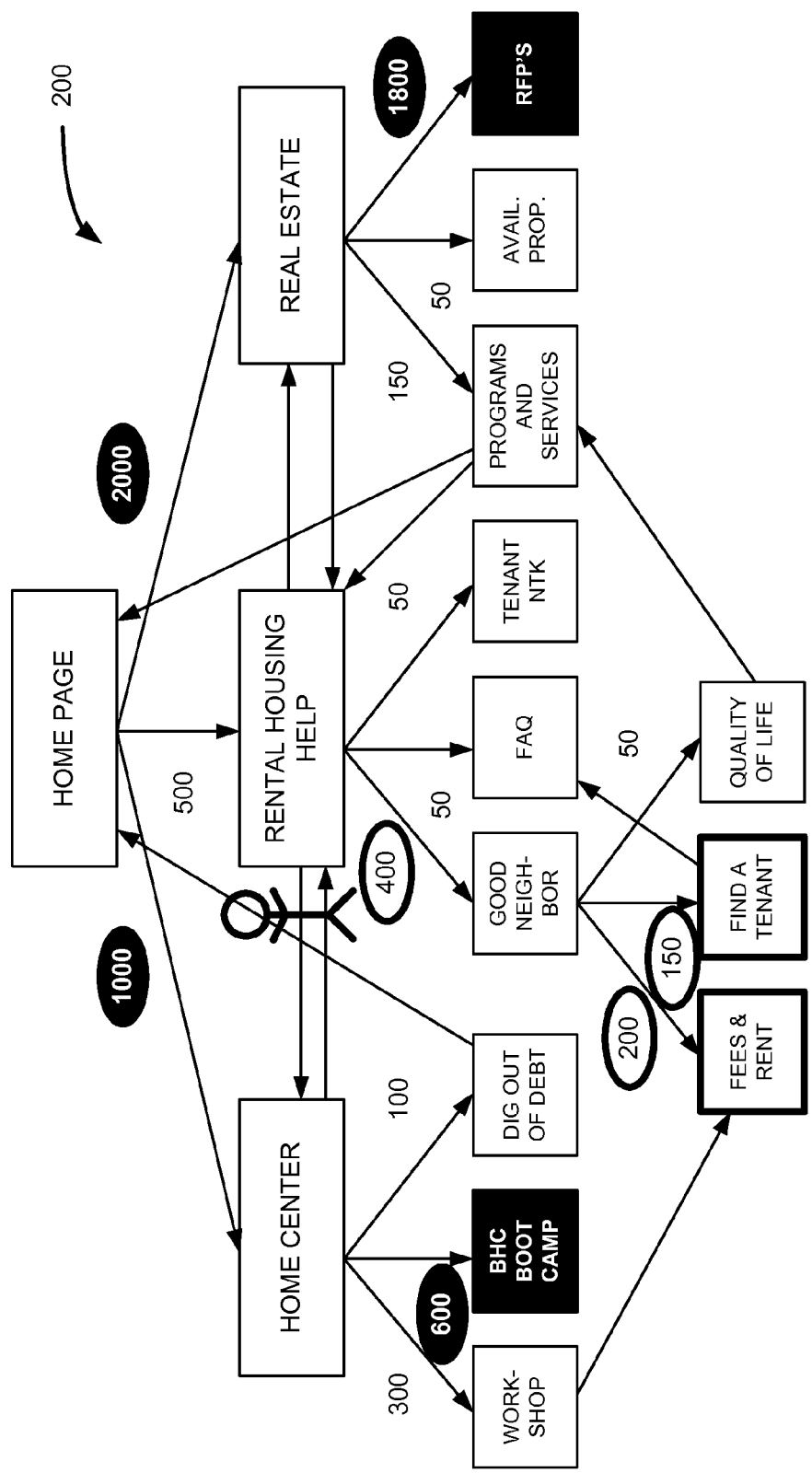
FIG. 2 is a logical data illustration of user interfaces within a web application, web application transition routes, and web application transition counts, according to an example embodiment.

FIG. 2 is a logical data illustration 200 of user interfaces within a web application, web application transition routes, and we application transition counts, according to an example embodiment. The logical data illustration 200 is an example of web application user interfaces and content items, transition routes, and transition counts, according to an example embodiment. The illustration 200 includes rectangles and squares that represent web application user interfaces and content items that are linked by lines with arrows that illustrate navigation paths taken by web application users. The numbers alongside the linking lines are counts of numbers of times that web application users have followed the navigation path illustrated by a respective linking line.

For example, web application user viewers of the HOME PAGE total 3,500, which is the sum of the numbers associated with linking lines flowing from the home page. 1,000 times web application users linked to HOME CENTER, 500 times to RENTAL HOUSING HELP, and 2,000 times to REAL ESTATE. The count data associated with the linking lines, in some embodiments is tracked and counted with regard to web application session, but without regard to the specific web application user. Thus, when a user visits the HOME PAGE and selects a link to RENTAL HOUSING HELP, the count associated with that navigation path through the web application will be incremented by one (1). Further, should that user select a link to GOOD NEIGH-BOR, that navigation path count would then be incremented by one (1). This data is recorded as users transition from user interface to user interface, or content item to content item within the web application, such as by a process that operates with regard to web application sessions to receive and service web application requests. Such a process may execute on a server, such as the one or more servers 106 of FIG. 1.

As used herein, the terms web page and content are synonymous in the sense that there are singly requested items within a website or web application and are used interchangeably, unless expressly stated otherwise. The processes herein, being stateful with regard to a web application session, are aware of currently viewed user interfaces and content items and then newly requested user interfaces and content items. Data of the transition including data identifying the current user interface, and content items when applicable, and data identifying the requested user interface, and content items when applicable, is then used to either create data representative of a new navigation path with a count of one (1) or to increment a counter associated with the navigation path when previously existing in stored data by one (1). This data may be stored in a database, a data structure in memory or storage of a webserver, or other server, and in other forms and on other devices depending on the particular embodiment. This data may also be stored in different forms, such as a log of navigation records that identify a unique session and may include time and date data of when the navigation occurred or other related date. The date data of such embodiments may be utilized to facilitate date-sensitive navigation path reference recommendations in some embodiments.

The navigation data may then be utilized to provide path reference recommendations of most common navigation destinations from any given point within a web application for which navigation history data has been stored. For example, a view of the HOME PAGE user interface in the logical data illustration 200 may be provided with path reference recommendations to the REAL ESTATE, RFP'S, HOME CENTER, and BHC BOOT CAMP user interfaces as these user interfaces, in order, are the most common navigation destinations from the HOME PAGE user interface. Note that the RFP'S and BHC BOOT CAMP user interfaces do not include, as represented in the illustration 200, direct navigation links from the HOME PAGE user interface. However, of the 2,000 session user viewers of the REAL ESTATE user interface, 1,800 of these users eventually navigated to RFP'S user interface. Thus, relevant path reference recommendations may be gleaned from the data of the illustration 200 that are one, two, or more navigation levels separated from a currently viewed web application user interface.

Further, the recommendations provided in some embodiments are specific to a currently viewed user interface or content item, such as a document. For example, a HOME PAGE user interface viewing user, rather than navigating to one of the more commonly visited user interfaces provided in recommendations presented within the HOME PAGE user interface as discussed in the preceding paragraph may instead select another path reference link and visit the RENTAL HOUSING HELP user interface. Based on this RENTAL HOUSING HELP user interface, path reference recommendations for that specific user interface and most user interfaces and other content items navigated to from that specific location within the web application may be identified and path reference recommendations provided. Such path reference recommendations, according to the data of the illustration 200, include the GOOD NEIGHBOR, FEES & RENT, and FIND A TENANT web application user interfaces.

Some further embodiments may include multiple types of path reference recommendations that may be provided together or separately within a viewed user interface. For example, path reference recommendations may be provided with regard to a currently viewed user interface and most commonly visited user interfaces viewed therefrom as already discussed. Other path reference recommendations may be provided in some embodiments with regard to most common destinations within the web application as a whole. Further, other embodiments may include other path reference recommendations that are specific to the web application user as provided by the web application or a third party and may include path reference recommendations to items offered for sale, other web applications and websites, and the like. However, these other path reference recommendations, such as may be provided by third parties or to items offered for sale that may be specific to the web application user are generally not generated according to the data of the illustration 200. Further, while some embodiments may include providing path reference recommendations based on the data of the illustration 200 intermingled with other path reference recommendations, the other path reference recommendations generally being tailored to specific individuals, are distinct recommendation-types from the other path reference recommendations contemplated herein that are not specific to an individual user but rather specific to a current location within the web application or a currently viewed user interface or content item.

Figure 3:
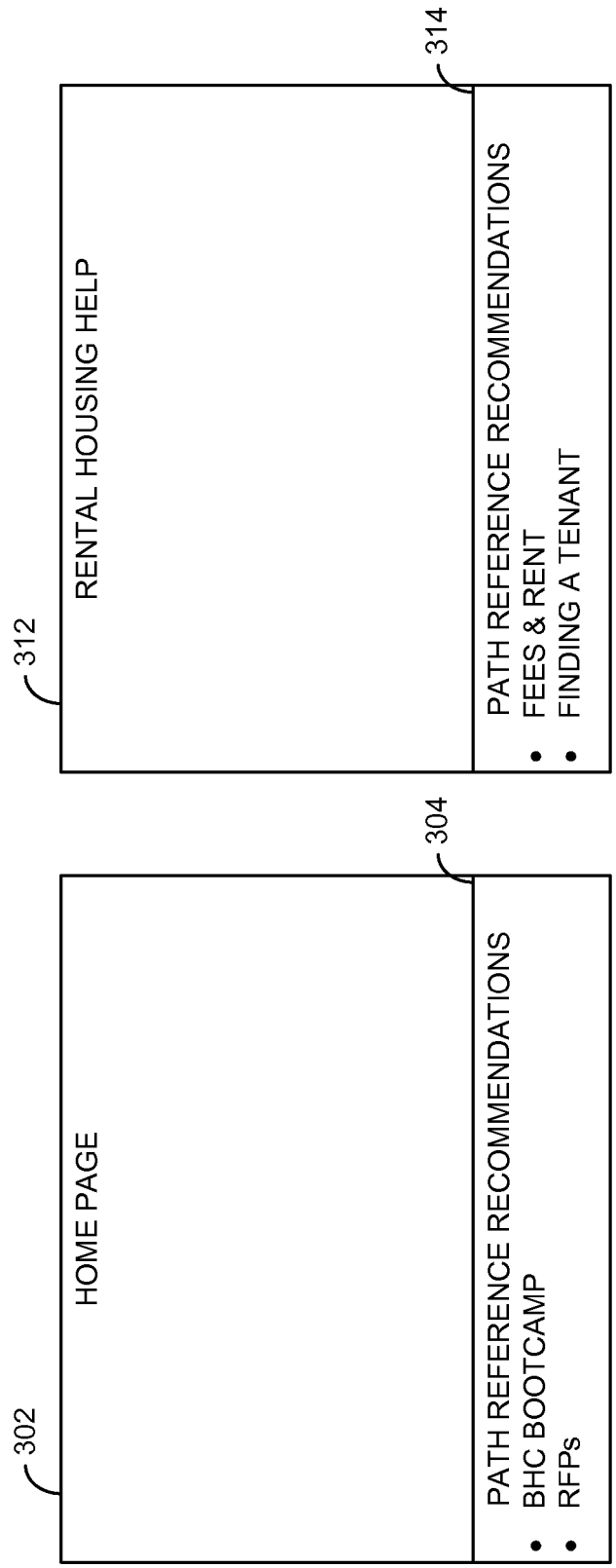
FIG. 3 includes example web application user interface illustrations including common path references, according to example embodiments.

FIG. 3 includes example web application user interface illustrations 302, 312 including common path references 304, 314, according to example embodiments. The user interfaces 302, 312 are examples of user interfaces for which path reference recommendations may be provided according to some embodiments. The user interfaces 302, 312 each include content (not illustrated) and a portion of the user interfaces 302, 312 where path reference recommendations 304, 314 are provided. The path reference recommendations 304, 314 can be included in the user interfaces 302, 312 at any location, so the user interfaces 302, 312 are not intended to be limiting on the scope of any embodiments, nor the claims.

The path reference recommendations 304, 314 are generated from the data of the illustration 200 of FIG. 2, in some embodiments. In such embodiments, the path reference recommendations 304, 314 are generated for inclusion in a view of the HOME PAGE user interface 302 while the path reference recommendations 314 are generated for inclusion in a view of the RENTAL HOUSING HELP user interface 312, respectively with reference to the illustration 200 of FIG. 2. Note that the path reference recommendations 304, 314 each provide two recommendations that are typically provided as navigation links, such as hyperlinks or intra-application navigation links, to the represented user interfaces. However, other embodiments may include only a single recommendation or three or more recommendations. The number of recommendations provided may be set according to one or more of configuration settings and an amount of available data.

In some embodiments, the path reference recommendations may also or alternatively be provided based on action data. Action data is a stored representation of user actions taken with regard to content and user interface controls presented within a target user interface of a path reference recommendation. For example, in one embodiment where a user interface of a path reference recommendation includes a user interface control to make a purchase of an item represented in the user interface of the path reference recommendation, an action may be selection of the user interface control. In some such embodiments, some such actions may be the subject of a rule that defines a content item action goal. A content item action goal may be defined to influence inclusion of a path reference recommendation in the path reference recommendations 304, 314 included in the user interfaces 302, 312. For example, the BHC BOOTCAMP user interface path reference recommendation included in the path reference recommendations 304 may be a user interface that includes a user interface control to purchase access to restricted content. A content item action goal may be defined in some embodiments with regard to the BHC BOOTCAMP user interface path reference to increase user exposure thereto to increase the likelihood of purchases and revenue derived therefrom.

The content item action goal in such embodiments may include a weighting value that amplifies a transition count from user interfaces and content items, such as the HOME PAGE user interface 302 to a BHC BOOTCAMP user interface. By amplifying the transition count according to a rule of such a content item action goal, the likelihood of inclusion of a path reference recommendation to the BHC BOOTCAMP user interface is increased. However, such embodiments preserve the benefits of the various embodiments herein of receiving path reference recommendations based on navigation paths taken by other users, or within other user sessions, as the rule does not totally or necessarily override the other recommendations. For example, where ranked path reference recommendations before application of a weighting of the BHC BOOTCAMP user interface content item action goal places the BHC BOOTCAMP user interface path reference recommendation fifth in the ranking, the weighting may move the BHC BOOTCAMP user interface path reference recommendation may move up only one spot. When only three recommendations are to be provided, the path reference recommendations are not impacted. However, should the BHC BOOTCAMP user interface path reference recommendation be moved to the top ranking and three path reference recommendations are provided, the user still receives two other path reference recommendations that are not impacted by the weighting.

Content item action goals and their associated rules can be generated for any number of reasons. For example, such reasons as stated above, can be defined for purposes of increasing sales and revenue. Other reasons can include exposing users to specific content or content types, identifying content that users interact with in different ways and for longer periods such as by sorting or filtering data, encouraging viewing of content associated with new or commonly misunderstood products or information, and the like.

User actions may also be tracked in a similar manner as content item transition routes. For example, when a user selects a control presented within a user interface to manipulate how data is presented, such as to sort or filter data presented in a user-interactive table, data representative of the action may be captured by the presented user interface or another component of the web application. The captured action data is stored on a server. In some action-tracking enabled embodiments, when a user interface or content item is requested, the requested user interface or content item may be provided not only with path reference recommendations, such as the path reference recommendations 304, 314, but also with action recommendations in a similar manner. The action recommendations may be obtained and provided by a server process that identifies most commonly performed actions with regard to a requested user interface or content item and the requested user interface or content item is provided along with one or both of a ranked list of top actions performed with regard to the user interface or content item and the path reference recommendations.

The action recommendations in such embodiments may be presented in a similar manner as the path reference recommendations 304, 314. However, while the path reference recommendations 304, 314 each provide a path to one or more other user interfaces or content items, an action recommendation provides a path to an action with regard to something included within a currently viewed user interface or content item. An action with regard to something included within a currently viewed user interface or content item of an action recommendation may manipulate how data or other content of a user interface or content item is presented or may also provide a path to another user interface or content item, such as a user interface within which a purchase may be completed or a content item that includes further information with regard to a product offered for sale.

While action recommendations in some embodiments may be presented in a similar manner as the path reference recommendations 304, 314, other embodiments may present action recommendations differently. For example, an action recommendation is typically associated with a user interface control or other portion of a presented user interface or content item, such as a control or content item presented by a user interface. Some embodiments in providing a view of an action recommendation may modify an appearance of the respective user interface control or other portion of a presented user interface or content item. The appearance modification may include one or more of highlighting, bolding text, outlining, flashing text or a background color, modifying colors within the presentation, and the like.

Figure 4:
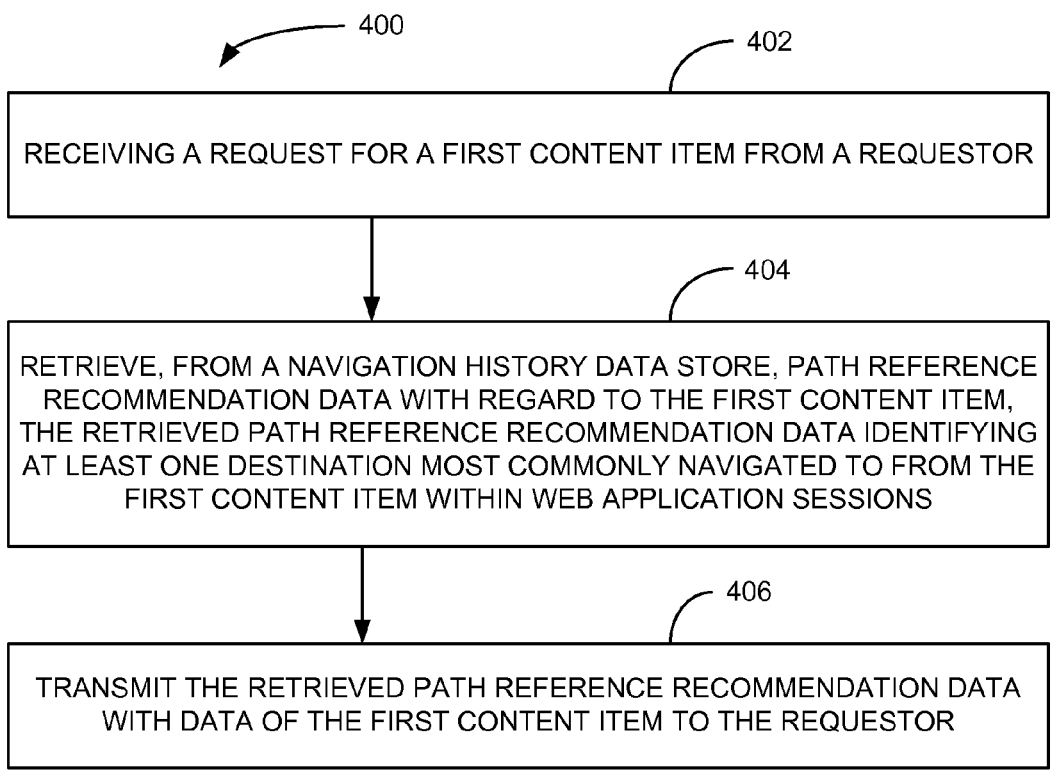
FIG. 4 is a block flow diagram of a method, according to an example embodiment.

FIG. 4 is a block flow diagram of a method 400, according to an example embodiment. The method 400 is an example of a method that may be performed by a path reference recommendation process based on web application navigation history data, such as is included in the illustration 200 of FIG. 2. The path reference recommendation process may execute on a webserver or other server computer involved, directly or indirectly, in servicing of web application requests received from computing devices of web application users.

The method 400 includes receiving 402 a request for a first content item, such as a user interface or content to be presented within a user interface of a web application, via a network interface device from a requestor. The method 400 may then retrieve 404, from a navigation history data store, path reference recommendation data with regard to the first content item. The retrieved path reference recommendation data typically identifies at least one destination most commonly navigated to from the first content item within web application sessions. The at least one destination may be a content item, such as a user interface, navigated to directly from the first content item or navigated to indirectly via one or more other content items. The method 400 further includes transmitting 406 the retrieved path reference recommendation data with data of the first content item to the requestor.

In some embodiments of the method 400, the retrieved 404 path reference recommendation data identifying at least one destination most commonly navigated to from the first content item within web application sessions is retrieved based in part on a configuration setting. The configuration setting may identify a number of navigation levels to consider in identifying at least one destination most commonly navigated to from the first content item within web application sessions. For example, a first navigation level is a content item, such as a user interface, that is navigated to directly from the first content item. A second navigation level is a content item, such as another user interface, that is not navigated to from the first content item, but rather a content item navigated to from a content item that is navigated to from the first content item. A further example, in the context of web application user interfaces as content items, is where there are user interfaces A, B, and C. From the first user interface A, the web application user navigates one level to user interface B, which is a first navigation level. From user interface B, the web application user navigates to user interface C, the second navigation level. Further navigation levels may be contemplated in various embodiments.

In some such embodiments of the method 400, the navigation history data store stores data representative of navigation destinations of a number of navigation levels with respect to a plurality of individual content items and a count with regard to a navigation from a higher level content item to each next level content item. An example is included in the illustration 200 of FIG. 2. Further, the configuration setting identifying the number of navigation levels to consider in identifying at least one destination most commonly navigated to from the first content item within web application sessions is at least a first number and no greater than a second number. These numbers may identify, for example, at least one (1) navigation level and no more than four (4) navigation levels. Other embodiments may include only a single number of navigation levels to contemplate for navigation recommendations, such as one (1), two (2), or more.

Figure 5:
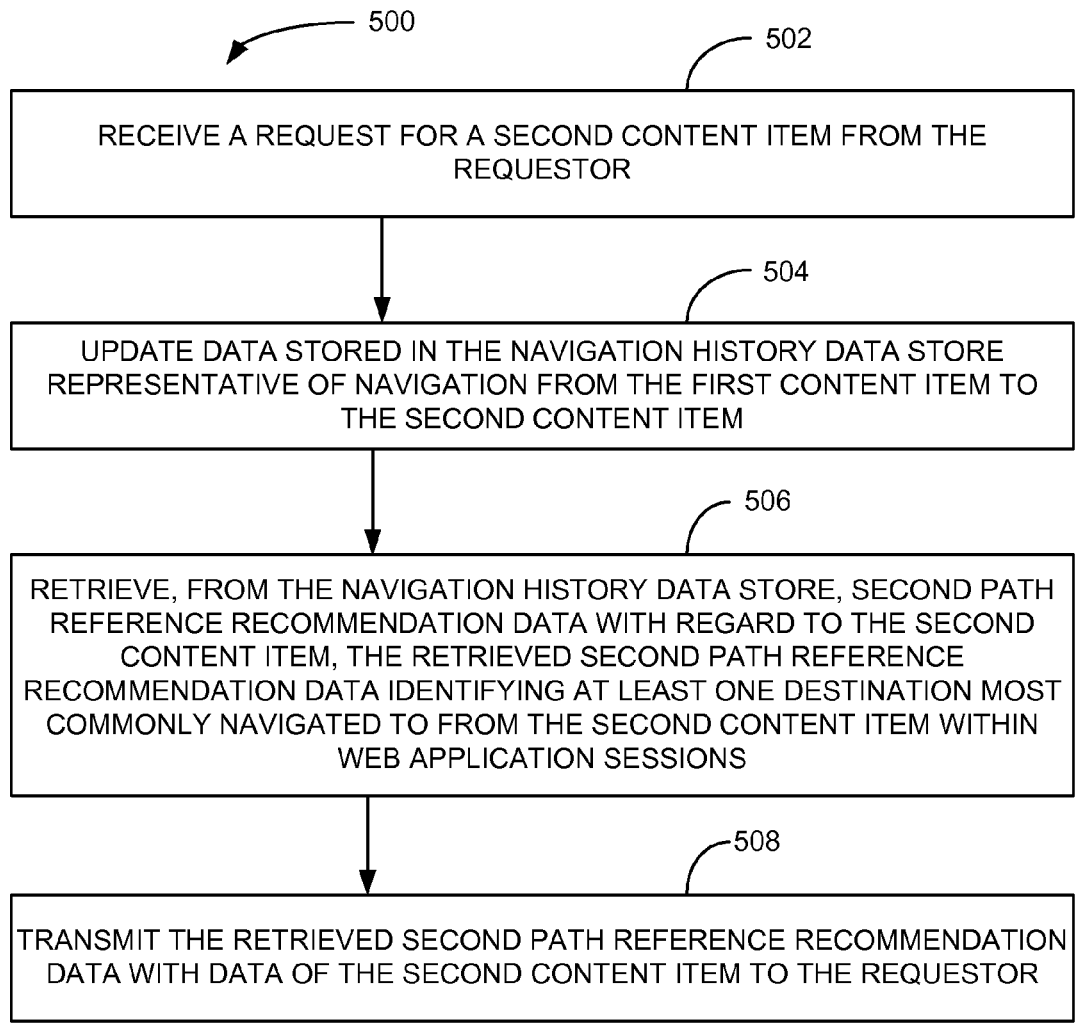
FIG. 5 is a block flow diagram of a method, according to an example embodiment.

FIG. 5 is a block flow diagram of a method 500, according to an example embodiment. The method 500 is a continuation of the method 400 according to some embodiments. The method 500 is an example of a method that tracks visited destinations based on web application user interaction with and navigation through a web application.

The method 500 includes receiving 502, within a web application session of the received request for the first content item, a request for a second content item from the requestor, such as a web application client app or application, and updating 504 data stored in the navigation history data store representative of navigation from the first content item to the second content item. Note that the first content item may generally be the content item transmitted 406 within the method 400 of FIG. 4.

The method 500 may further include retrieving 506, from the navigation history data store, second path reference recommendation data with regard to the second content item. The retrieved second path reference recommendation data typically identifies at least one destination most commonly navigated to from the second content item within web application sessions. The method 500 may then transmit 508 the retrieved second path reference recommendation data with data of the second content item to the requestor.

Figure 6:
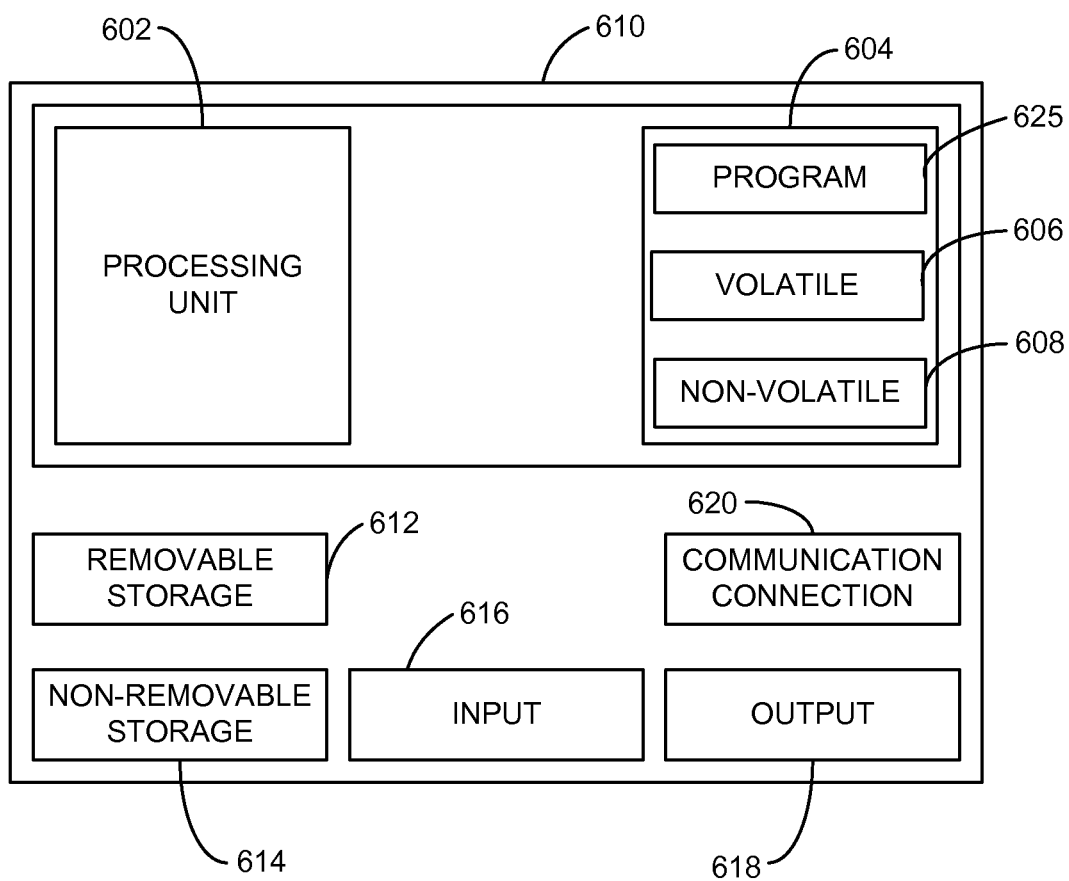
FIG. 6 is a block diagram of a computing device, according to an example embodiment.

FIG. 6 is a block diagram of a computing device, according to an example embodiment. In one embodiment, multiple such computer systems are utilized in a distributed network to implement multiple components in a transaction-based environment, such as is illustrated in FIG. 5. An object-oriented, service-oriented, or other architecture may be used to implement such functions and communicate between the multiple systems and components. One example computing device in the form of a computer 610, may include a processing unit 602, memory 604, removable storage 612, and non-removable storage 614. Although the example computing device is illustrated and described as computer 610, such as a personal computer, server computer, and the like, the computing device may be in different forms in different embodiments. For example, the computing device may instead be a smartphone, a tablet, smartwatch, or other computing device including the same or similar elements as illustrated and described with regard to FIG. 6. Devices such as smartphones, tablets, and smartwatches are generally collectively referred to as mobile devices. Further, although the various data storage elements are illustrated as part of the computer 610, the storage may also or alternatively include cloud-based storage accessible via a network, such as the Internet.

Returning to the computer 610, memory 604 may include volatile memory 606 and non-volatile memory 608. Computer 610 may include—or have access to a computing environment that includes a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 610 may include or have access to a computing environment that includes input 616, output 618, and a communication connection 620. The input 616 may include one or more of a touchscreen, touchpad, mouse, keyboard, camera, one or more device-specific buttons, one or more sensors integrated within or coupled via wired or wireless data connections to the computer 610, and other input devices. The computer 610 may operate in a networked environment using a communication connection 620 to connect to one or more remote computers, such as database servers, web servers, and other computing device. An example remote computer may include a personal computer (PC), server, router, network PC, a peer device or other common network node, or the like. The communication connection 620 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 620 may also or alternatively include a transceiver device, such as a BLUETOOTH® device that enables the computer 610 to wirelessly receive data from and transmit data to other BLUETOOTH® devices.

Computer-readable instructions stored in a non-transitory form on a computer-readable medium are executable by the processing unit 602 of the computer 610. A hard drive (magnetic disk or solid state), CD-ROM, and RAM are some examples of articles including a non-transitory computer-readable medium. For example, various computer programs 625 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A server path reference recommendation system comprising:
   at least one processor;
   at least one network interface device;
   at least one memory device storing instructions executable by the at least one processor to perform data processing activities, the data processing activities comprising:
      receiving a request for a first content item via the at least one network interface device from a requestor;
      retrieving, from a navigation history data store stored on the at least one memory device, path reference recommendation data with regard to the first content item, wherein the retrieved path reference recommendation data describes of set of destinations most commonly navigated to from the first content item within web application sessions, and wherein the set of destinations comprises a first destination separated from the first content item by one navigation level and a second destination separated from the first content item by at least two navigation levels; and
      transmitting the retrieved path reference recommendation data with data of the first content item to the requestor.

2. The server path reference recommendation system of claim 1, wherein the retrieved path reference recommendation data identifying at least one destination most commonly navigated to from the first content item within web application sessions is retrieved based in part on a configuration setting identifying a number of navigation levels to consider in identifying at least one destination most commonly navigated to from the first content item within web application sessions.

3. The server path reference recommendation system of claim 2, wherein the navigation history data store stores data representative of navigation destinations of a number of navigation levels with respect to a plurality of individual content items and a count with regard to a navigation from a higher level content item to each next level content item.

4. The server path reference recommendation system of claim 3, wherein the configuration setting identifying the number of navigation levels to consider in identifying at least one destination most commonly navigated to from the first content item within web application sessions is at least a first number and no greater than a second number.

5. The server path reference recommendation system of claim 1, the data processing activities further comprising:
   receiving, within a web application session of the received request for the first content item, a request for a second content item from the requestor;
   updating data stored in the navigation history data store representative of navigation from the first content item to the second content item;
   retrieving, from the navigation history data store, second path reference recommendation data with regard to the second content item, the retrieved second path reference recommendation data identifying at least one destination most commonly navigated to from the second content item within web application sessions; and transmitting the retrieved second path reference recommendation data with data of the second content item to the requestor.

6. The server path reference recommendation system of claim 5, wherein the first and second content items are web application user interfaces.

7. A method comprising:
receiving a request for a first content item via a network interface device from a requestor;
retrieving, from a navigation history data store, path reference recommendation data with regard to the first content item, the retrieved path reference recommendation data describing a set of destinations most commonly navigated to from the first content item within web application sessions, and wherein the set of destinations comprises a first destination separated from the first content item by one navigation level and a second destination separated from the first content item by at least two navigation levels; and
transmitting the retrieved path reference recommendation data with data of the first content item to the requestor.

8. The method of claim 7, wherein the retrieved path reference recommendation data identifying at least one destination most commonly navigated to from the first content item within web application sessions is retrieved based in part on a configuration setting identifying a number of navigation levels to consider in identifying at least one destination most commonly navigated to from the first content item within web application sessions.

9. The method of claim 8, wherein the navigation history data store stores data representative of navigation destinations of a number of navigation levels with respect to a plurality of individual content items and a count with regard to a navigation from a higher level content item to each next level content item.

10. The method of claim 9, wherein the configuration setting identifying the number of navigation levels to consider in identifying at least one path reference most commonly navigated to from the first content within web application sessions is at least a first number and no greater than a second number.

11. The method of claim 7, further comprising:
receiving, within a web application session of the received request for the first content item, a request for a second content item from the requestor; and
updating data stored in the navigation history data store representative of navigation from the first content item to the second content item.

12. The method of claim 11, wherein the first and second content items are web application user interfaces.

13. The method of claim 11, further comprising:
retrieving, from the navigation history data store, second content item navigation recommendation data with regard to the second content item, the retrieved second content item navigation recommendation data identifying at least one destination most commonly navigated to from the second content item within web application sessions; and
transmitting the retrieved second path reference recommendation data with data of the second content item to the requestor.

14. A non-transitory, computer-readable medium, with instructions stored thereon that are executable by at least one processor of a computing device to cause the computing device to perform data processing activities, the data processing activities comprising:
receiving a request for a first content item via a network interface device from a requestor;
retrieving, from a navigation history data store, path reference recommendation data with regard to the first content item, wherein the retrieved path reference recommendation data describes a set of destinations most commonly navigated to from the first content item within web application sessions, and where the set of destinations comprises a first destination separated from the first content item by one navigation level and a second destination separated from the first content item by at least two navigation levels; and
transmitting the retrieved path reference recommendation data with data of the first content item to the requestor.

15. The non-transitory, computer-readable medium of claim 14, wherein the retrieved path reference recommendation data identifying at least one destination most commonly navigated to from the first content item within web application sessions is retrieved based in part on a configuration setting identifying a number of navigation levels to consider in identifying at least one destination most commonly navigated to from the first content item within web application sessions.

16. The non-transitory, computer-readable medium of claim 15, wherein the navigation history data store stores data representative of navigation destinations of a number of navigation levels with respect to a plurality of individual content items and a count with regard to a navigation from a higher level content item to each next level content item.

17. The non-transitory, computer-readable medium of claim 16, wherein the configuration setting identifying the number of navigation levels to consider in identifying at least one destination most commonly navigated to from the first content item within web application sessions is at least a first number and no greater than a second number.

18. The non-transitory, computer-readable medium of claim 17, wherein the first number is one (1) and the second number is four (4).

19. The non-transitory, computer-readable medium of claim 14, the data processing activities further comprising:
receiving, within a web application session of the received request for the first content item, a request for a second content item from the requestor; and
updating data stored in the navigation history data store representative of navigation from the first content item to the second content item.

20. The non-transitory, computer-readable medium of claim 19, the data processing activities further comprising:
retrieving, from the navigation history data store, second path reference recommendation data with regard to the second content item, the retrieved second path reference recommendation data identifying at least one web page destination most commonly navigated to from the second content item within web application sessions; and
transmitting the retrieved second path reference recommendation data with data of the second content item to the requestor.

* * * * *